United States Patent
Jorgensen

(10) Patent No.: US 11,441,718 B2
(45) Date of Patent: Sep. 13, 2022

(54) COMPENSATOR ARRANGEMENT FOR TRANSPORT SYSTEMS

(71) Applicant: EAGLEBURGMANN GERMANY GMBH & CO. KG, Wolfratshausen (DE)

(72) Inventor: Henrik Jorgensen, Vejen (DK)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 50 days.

(21) Appl. No.: 17/057,804

(22) PCT Filed: May 9, 2019

(86) PCT No.: PCT/EP2019/061892
§ 371 (c)(1),
(2) Date: Nov. 23, 2020

(87) PCT Pub. No.: WO2019/228774
PCT Pub. Date: Dec. 5, 2019

(65) Prior Publication Data
US 2021/0199225 A1    Jul. 1, 2021

(30) Foreign Application Priority Data

May 29, 2018 (DE) ............ 10 2018 208 477.7

(51) Int. Cl.
*F16L 51/02* (2006.01)
*F16L 23/036* (2006.01)
(Continued)

(52) U.S. Cl.
CPC ........... *F16L 51/022* (2013.01); *F16L 23/036* (2013.01); *F16L 27/108* (2013.01); *F16L 51/024* (2013.01); *F16L 27/1012* (2013.01)

(58) Field of Classification Search
CPC ..... F16L 51/022; F16L 51/024; F16L 23/036; F16L 27/108; F16L 27/1012
(Continued)

(56) References Cited

U.S. PATENT DOCUMENTS 4,536,018 A * 8/1985 Patarcity ............... F16L 27/108
285/229
4,717,181 A * 1/1988 Maier .................... F16L 51/024
285/229
(Continued)

FOREIGN PATENT DOCUMENTS

CN    204756225 U    11/2015
CN    205504273 U    8/2016
(Continued)

OTHER PUBLICATIONS

International Search Report issued in PCT/EP2019/061892, dated Jul. 22, 2019.
(Continued)

*Primary Examiner* — Zachary T Dragicevich
(74) *Attorney, Agent, or Firm* — Locke Lord LLP; Scott D. Wofsy; Michael J. Pollack

(57) ABSTRACT

A compensator arrangement comprising a first fixing unit, a second fixing unit, and an intermediate flexible member removably arranged between the first fixing unit and the second fixing unit and comprising a main body, a first radial end flange and a second radial end flange, wherein the first fixing unit comprises a first connecting member having a first connecting body and a first fixing flange having a plurality of through-holes, a first counter ring, a first clamping ring and a first clamping device for releasably clamping the first radial end flange.

11 Claims, 7 Drawing Sheets

(51) Int. Cl.
*F16L 27/108* (2006.01)
*F16L 27/10* (2006.01)

(58) Field of Classification Search
USPC .................................... 285/145.5, 226, 229
See application file for complete search history.

(56) References Cited

U.S. PATENT DOCUMENTS

| | | | | |
|---|---|---|---|---|
| 6,050,614 | A | * | 4/2000 | Kirkpatrick ......... F16L 23/0283 |
| 6,631,928 | B1 | * | 10/2003 | Sakata ................ F16L 27/1085 |
| | | | | 285/299 |
| 2017/0356584 | A1 | * | 12/2017 | Hagiya ................ F16L 27/108 |

FOREIGN PATENT DOCUMENTS

| | | |
|---|---|---|
| CN | 107542984 A | 1/2018 |
| DE | 2847892 A1 | 5/1980 |
| DE | 8709221 U1 | 11/1987 |
| DE | 102010060981 B3 | 5/2012 |
| GB | 795786 A | 5/1958 |
| JP | H01126488 A | 5/1989 |
| JP | H10051201 A | 2/1998 |
| KR | 20120052702 A | 5/2012 |

OTHER PUBLICATIONS

Japanese Office Action dated Jan. 17, 2022, issued during the prosecution of Japanese Patent Application No. JP 2020565744, 9 pages.

* cited by examiner

COMPENSATOR ARRANGEMENT FOR TRANSPORT SYSTEMS

CROSS-REFERENCE TO RELATED APPLICATIONS

This application is a U.S. National Phase Application filed under 35 U.S.C. § 371, based on International Patent Application No. PCT/EP2019/061892, filed May 9, 2019, which claims priority to German Patent Application No. 10 2018 208 477.7, filed on May 29, 2018. The entire contents of these applications is incorporated herein by reference.

BACKGROUND OF THE INVENTION

The invention relates to a compensator arrangement, especially for transport systems or the like, adapted to connect two members, especially to compensate for relative movements between the pipe members.

Compensator arrangements with various designs are known from prior art for use in transport systems. Compensator arrangements provide flexible connection between two pipe members or the like, for example to compensate for thermal length changes in the pipe system. Moreover, shaking or riddling movements or the like may occur across the entire pipe system. For example, such shaking or riddling movements occur in food transport systems when weighing and packing powdered food such as flour, milk powder or the like. Depending on the dimensions of the system, compensators may have cross-sections of more than one meter. An example of a compensator arrangement is shown in WO 2007/133094 A1, which discloses a flexible pipe, where one end of the pipe can be pushed radially inwards to be connected to a connecting pipe. Herein, the flexible pipe comprises two circumferential beads, which, in the assembled state, retain a bead of the connecting pipe between them. Although this compensator arrangement can be mounted in a very quick and easy manner, sealing problems may arise during operation, especially during vibrant transport processes.

SUMMARY OF THE INVENTION

It is therefore the object of the present invention to provide a compensator arrangement which, while being of simple design and inexpensive manufacture, provides for quick assembly while at the same time ensuring maximum tightness.

This object will be solved by a compensator arrangement having the features of claim 1; preferred further developments of the invention are set forth in the subclaims.

The compensator arrangement according to the invention having the features of claim 1 has the advantage in that a flexible connection of two pipe members or the like is realized. Thus, maximum tightness in the area of the compensator arrangement will be achieved. Furthermore, the compensator arrangement may have a long service life. Furthermore, quick exchange of a flexible intermediate member is possible. According to the invention, this will be achieved by the compensator arrangement comprising a first and a second fixing unit, wherein a flexible intermediate member is detachably arranged between the first and second fixing unit. The intermediate member comprises a main body and first and second radial end flanges located at opposite ends of the main body. The first fixing unit comprises a first connecting member having a first connecting body and a first fixing flange having a plurality of through-holes, a first counter-ring and a first clamping ring, as well as a clamping device for releasably clamping the first radial end flange of the flexible intermediate member. The first clamping device comprises bolts and elongated recesses for receiving the bolts. Furthermore, the second fixing unit comprises a second connecting member having a second connecting body and a second fixing flange having a plurality of through-holes, a second counter ring, a second clamping ring and a second clamping device. Thus, the second clamping device releasably clamps the second radial end flange of the flexible intermediate member, wherein the second clamping device also comprises bolts and elongated recesses for receiving the bolts. Furthermore, the first end flange of the flexible intermediate member is fluid-tightly clamped between the first fixing flange of the first connecting member and the first counter ring. The second end flange of the flexible intermediate member is fluid-tightly clamped between the second fixing flange of the second connecting member and the second counter ring. The flexible intermediate member comprises a hose-like main body including the first and second end flanges, which radially protrude from the main body. The bolts are passed through the through-holes of the first and second fixing flange respectively. This provides a compensating arrangement which is highly fluid-tight. However, it can easily and quickly be assembled and disassembled to allow replacement of the flexible intermediate member in case of damage or the like.

Further preferably, the bolts of the clamping device include a head, especially a ball head.

The bolts are preferably fixed to the counter ring, and the elongated recesses are arranged on the clamping ring. However, it should be noted that it is also possible for the blots to be provided on the clamping ring and the elongated recesses to be provided on the counter ring.

The bolts are preferably configured as screw bolts. The bolts are preferably screwed into the counter ring.

Preferably, the flexible intermediate member is a hose and is made of a flexible plastic material. Preferably, the plastic material is transparent. This means for the compensator arrangement to have a monitoring function in addition to the compensation function, as the product conveyed inside the compensator is visible through the transparent flexible plastic material.

Preferably, the elongated recesses comprise a ramp inclined to a radial plane. Clamping of the clamping device is achieved by inserting the heads of the bolts into the elongated recesses and a subsequent relative movement between the bolt and the clamping ring, thereby exerting an axial clamping force on the two end flanges of the flexible intermediate member. This axial clamping force is applied to both end flanges of the flexible intermediate member.

Furthermore, the elongated recesses preferably are arcuate, thereby causing relative rotation between the counter ring and the first clamping ring as well as the second counter ring and the second clamping ring to clamp the flexible intermediate member between the counter rings and the connecting members. Alternatively, the elongated recesses are linear longitudinal recesses, so that a linear relative movement between the counter ring and the clamping ring is will be performed for clamping.

The elongated recesses are preferably formed such that they form an elongated through-hole, wherein two inclined ramps run along the lateral wall areas of the elongated through-hole to enable clamping in the axial direction of the compensator arrangement.

More preferably, the compensator arrangement comprises indicator means for determining an end position of the assembled compensator arrangement. For example, the indicator means may be formed by additional indicator holes through which a marker may be seen when the change in position caused by the relative movement between the counter ring and the clamping ring during clamping reaches the correct position. In particular, this may also ensure a predefined clamping force to be achieved between the components to accomplish sufficient and permanent sealing of the compensator arrangement.

Preferably, the first and second connecting members comprise an axial projection on the inside of the fixing flange, which protrudes in the axial direction and runs around the circumference. The first and second end flange of the flexible intermediate member is clamped between the axial projection and an inner circumferential edge of the counter ring. This ensures particularly reliable sealing, as in this area the material of the flexible intermediate member may be sealed using line pressure.

It should be noted that the compensator arrangement may be provided in various geometrically different shapes. On the one hand, the components of the compensator device, in particular the first and/or second connecting body, may each be essentially cylindrical or ring-shaped, thus having a circular inner diameter or alternatively an inner polygonal cross-section, in particular a quadrangular cross-section. Due to the compensator arrangement, it will furthermore be allowed, for example, to also change a circular cross section into a polygonal cross section or vice versa. Thus, the compensator arrangement may also provide an adapter function when connecting components. It is advantageous for the first connecting body of the first connecting member to be cylindrical and the second connecting body of the second connecting member to be rectangular.

To achieve a clamping force equally distributed along the circumference, the elongated recesses of the clamping device and the bolts are equally distributed along the circumference.

Furthermore, the present invention relates to a transport system comprising a compensator arrangement according to the invention. The compensator arrangement is arranged between a first and second pipe member of the transport system, and compensating for temperature-related changes of length and also relative movements between the pipe members. Connection of the compensator arrangement to the pipe members may, for example, be done by a welded joint on the first and second connecting member of the compensator arrangement.

In the following, preferred example embodiments of the invention will be described in detail while making reference to the accompanying drawing, wherein:

DETAILED DESCRIPTION OF THE INVENTION

Referring now to FIGS. 1 to 11, a compensator arrangement 1 will be described in detail below according to a preferred example embodiment of the invention.

The compensator arrangement 1 is adapted to create connection between a first and a second pipe member 2, 2' of a transport system. The transport system is preferably used in the food industry for conveying powdery or granular materials, such as powdered milk or grain or the like.

The compensator arrangement 1 has a compensating function between the pipe members 2, 2' of the transport system, as, for example, changes in length of the components may occur due to temperature changes, which will be compensated when using the compensator arrangement. Furthermore, the compensator arrangement 1 also is for vibration decoupling of pipe members, for example, when a pipe member extends to a filling and weighing station where the transported goods have been placed into a package and are riddled before weighing to allow homogeneous filling of the package. In this case, the compensator arrangement 1 compensates for the shaking movements, which can also be transferred to a pipe member, and prevents further transfer to the remaining pipe systems of the transport system.

Figure 1:
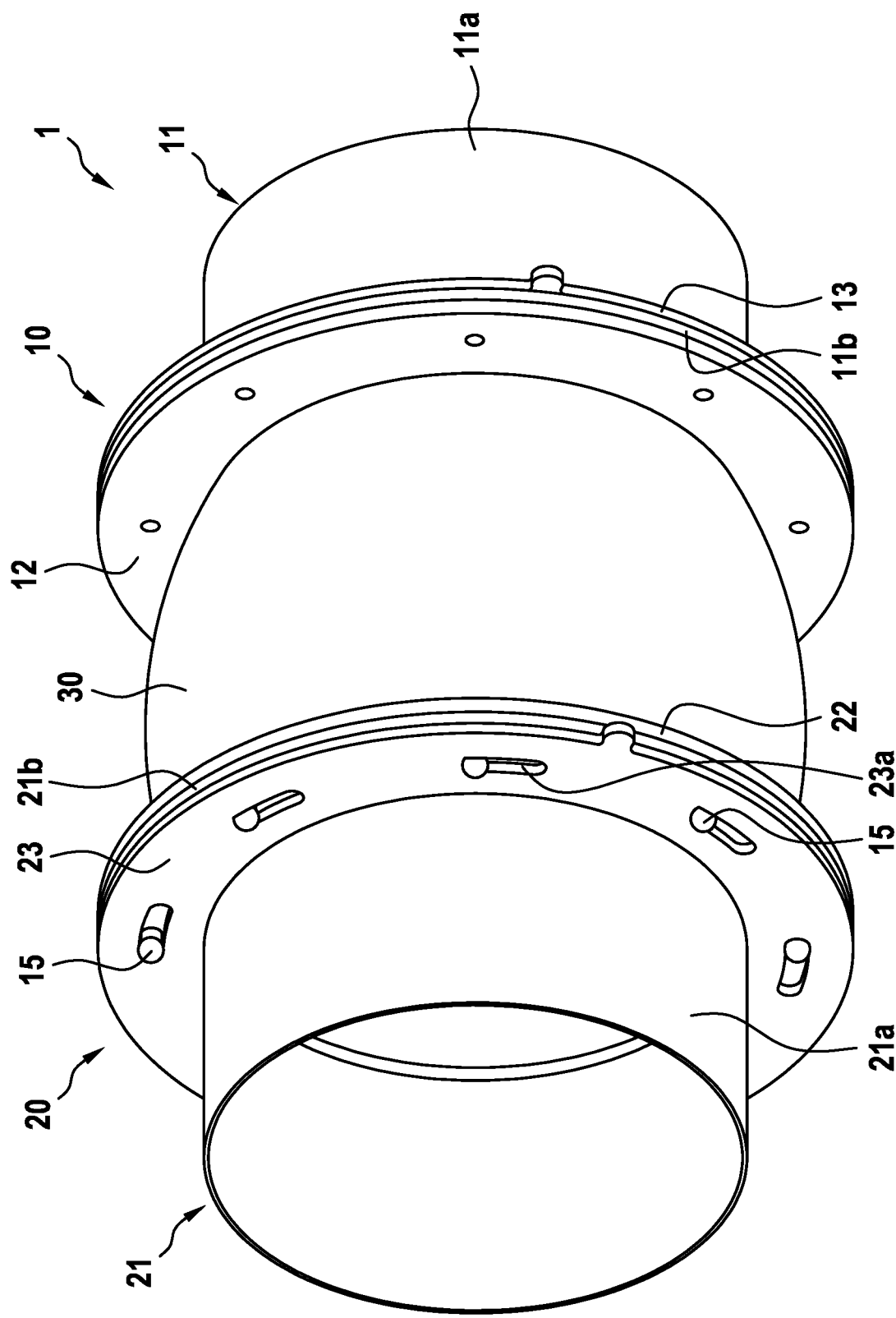
FIG. 1 is a schematic, perspective view of a compensator arrangement according to an example embodiments of the invention.
Figure 2:
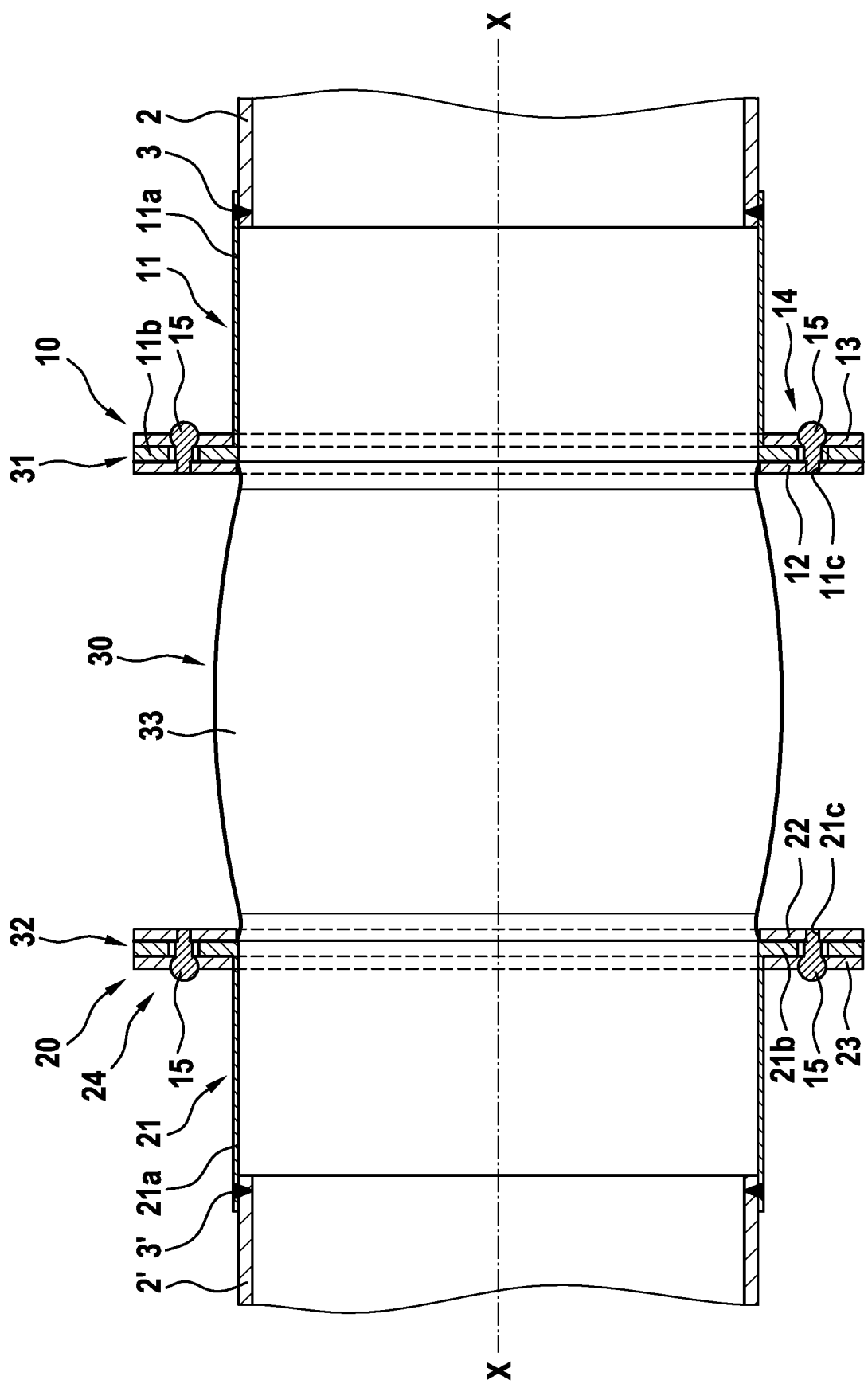
FIG. 2 is a schematic sectional view of the compensator arrangement of FIG. 1.

As shown in FIGS. 1 and 2, the compensator arrangement 1 comprises a first fixing unit 10 and a second fixing unit 20 as well as a flexible intermediate member 30 comprising a flexible main body 33, a first end flange 31 and a second end flange 32. The first and second fixing units connect the intermediate member 30 to the pipe members 2, 2'.

The first end flange 31 and the second end flange 32 are each formed as radially projecting outwards on a first end and a second end of the main body 33, so that the two end flanges 31, 32 are formed in one piece with the main body 33 in the form of a ring radially projecting outwards. The flexible intermediate member 30 is preferably made of a flexible, especially transparent, plastic material.

As may be seen from FIGS. 1 and 2, the first fixing unit 1 and the second fixing unit 2 are identically constructed, but arranged mirror-inverted.

Figure 11:
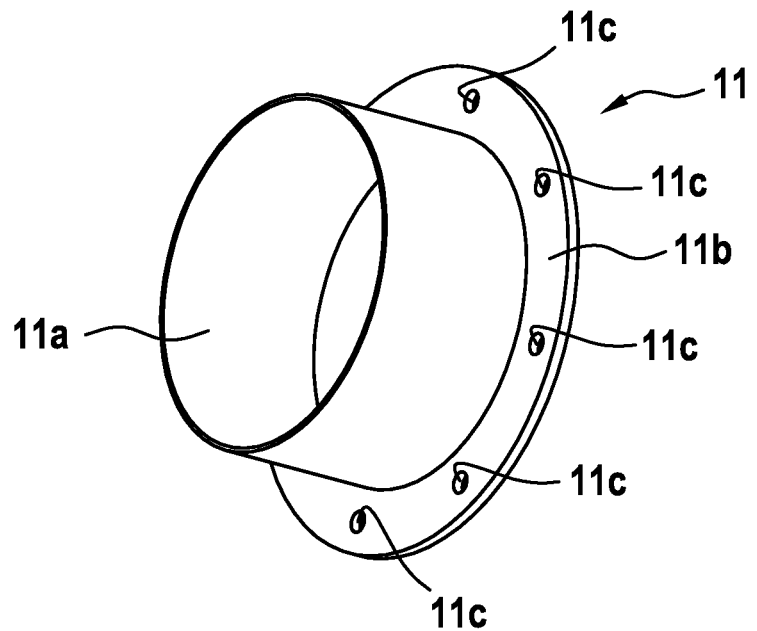
FIG. 11 is a schematic, perspective view of a connecting member of the compensator arrangement of FIG. 1.

The first fixing unit 10 comprises a first connecting member 11 comprising a first pipe-shaped connecting body 11a, a radially outwardly directed fixing flange 11b and through-holes 11c in the fixing flange 11b. The first connecting member 11 is schematically shown in FIG. 11.

As furthermore schematically shown in FIG. 2, the first connecting body 11a is connected to a first pipe member 2 by means of a first welded joint 3.

Furthermore, the first fixing unit 10 comprises a first counter ring 12, a first clamping ring 13 and a first clamping device 14.

Figure 3:
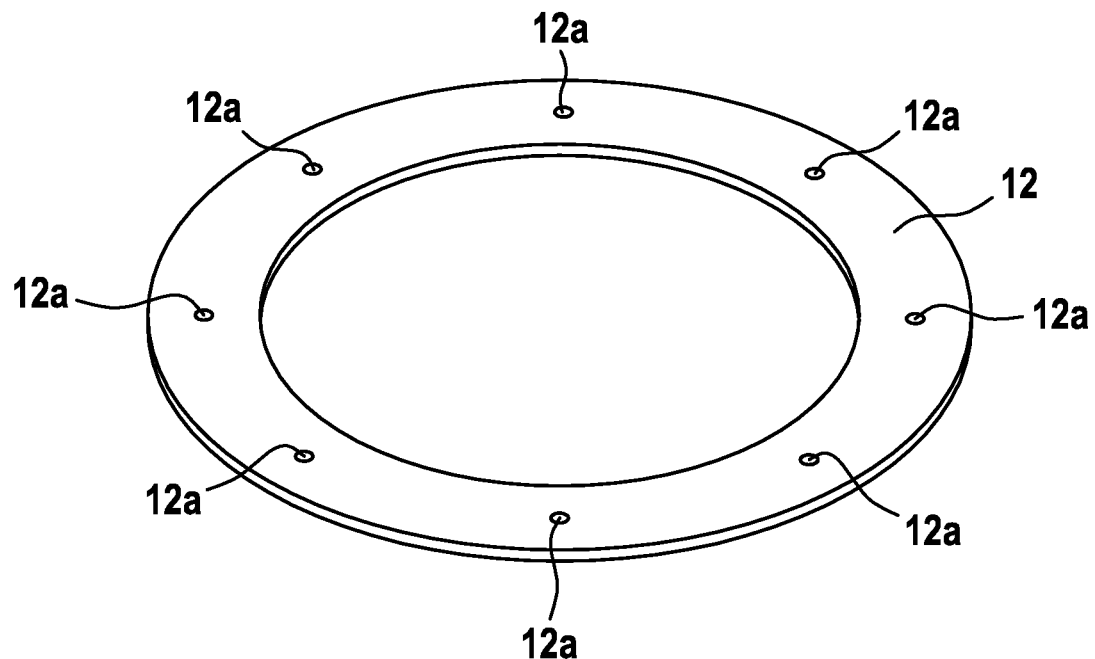
FIG. 3 is a schematic, perspective view of a counter ring of the compensator arrangement of FIG. 1.

The first counter ring 12 is shown in detail in FIG. 3. As shown, the first counter ring 12 has a large number of threaded holes 12a which are formed on a central circumferential line on the first counter ring 12 and are equally spaced apart from each other in the circumferential direction. Bolt 15 of the first clamping device 14 is screwed into the threaded holes 12a.

Figure 4:
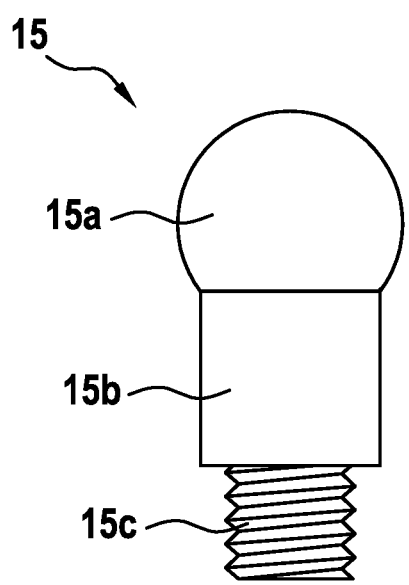
FIG. 4 is a schematic side view of a bolt of a clamping device of the compensator arrangement of FIG. 1.

In FIG. 4, a bolt 15 is shown in detail. The bolt 15 comprises a ball head 15a, a body 15b and a thread 15c for engaging into the first counter ring 12. All bolts 15 are identically designed.

FIGS. 6 to 10 show a first clamping ring 13 of the first fixing unit 10 in detail. As may in particular be seen from FIG. 6, the first clamping ring 13 comprises a large number of elongated recesses 13a. The elongated recesses 13a are also arranged adjacent to each other in circumferential direction having equal distances between them. The elongated recesses 13a are arcuate. The elongated recesses 13a form part of the first clamping device 14.

Figure 7:
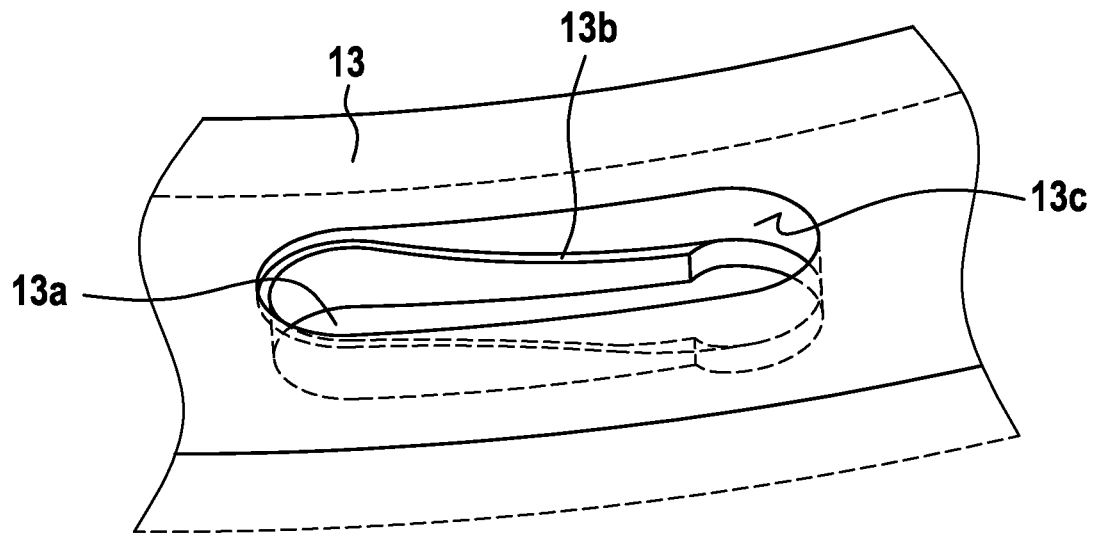
Figure 8:
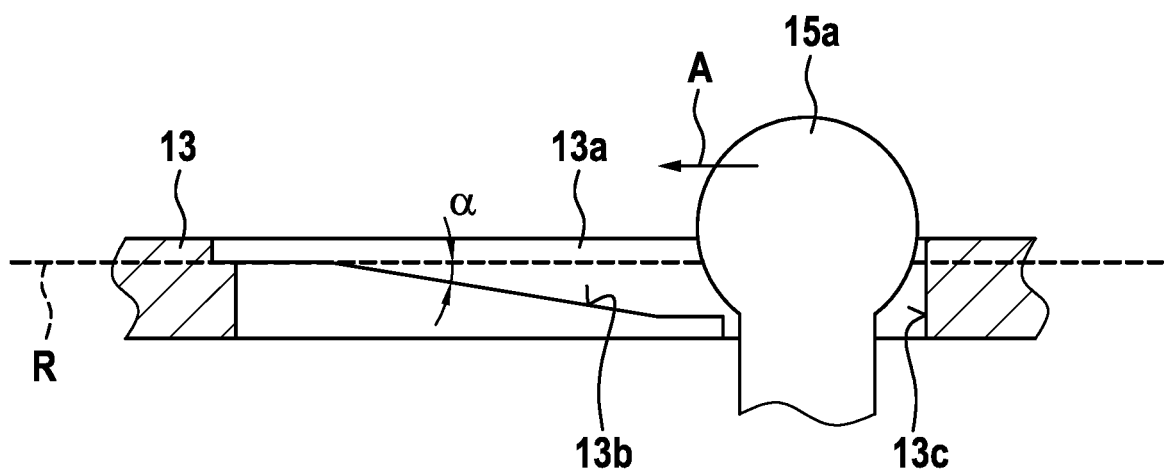
Figure 9:
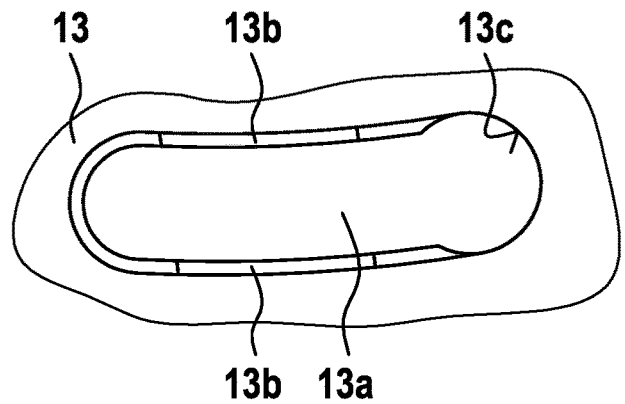

As may be seen in detail in FIGS. 7, 8 and 9, the elongated recesses 13a are configured such that two ramps 13b are formed at the edge of the recess 13a. The ramps 13b are inclined at an acute angle towards a radial plane R, perpendicular to the axial direction X-X, of the clamping ring (see FIG. 8) and serve to guide the head 15a of the bolt 15 of the clamping device 14. Thus, the head 15a of the bolt 15 is inserted into a through-hole 13c in the ramp-free area and then guided in the direction of the elongated recess until contact will be made with the ramps 13b. Herein, the head 15a of the bolt is pushed onto the ramps 13b by a relative rotation between the first counter ring 12, to which the bolt is attached, and the first clamping ring 13.

FIG. 8 schematically illustrates the head 15a of bolt 15 inserted into the elongated recess 13a in the state not yet clamped. The relative rotation between the first counter ring 12 and the first clamping ring 13 causes the first counter ring 12 to axially move towards the first clamping ring 13, clamping the first end flange 31 and first fixing flange 11b located between the first counter ring 12 and the first clamping ring 13.

Figure 10:
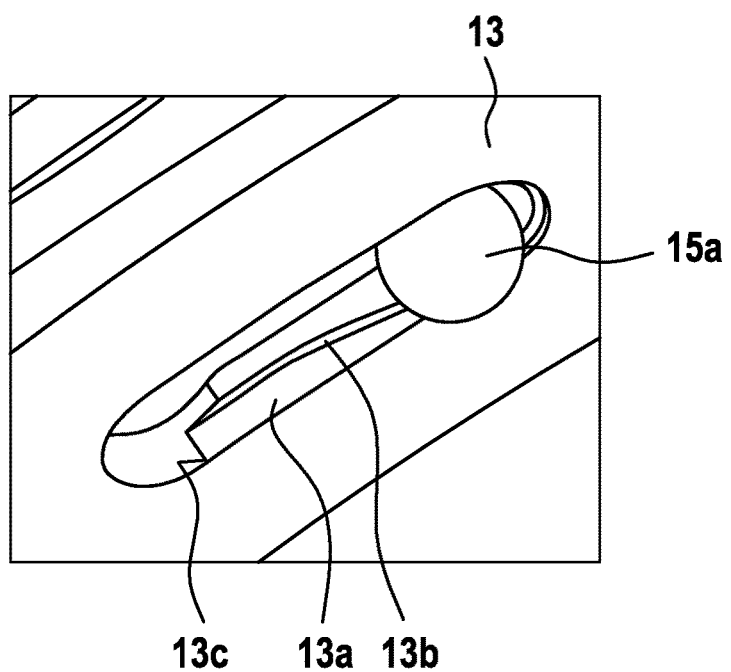
FIG. 10 is a schematic view of a clamping device of the compensator arrangement in a clamped state.

A clamped bolt 15 in the elongated recess 13a is shown in detail in FIG. 10. As shown in FIG. 8, this clamping state will be realized when the bolt head 15a is moved in the direction of arrow A along the elongated recess 13a, or the clamping ring 13 is moved relative to the bolt 15. For this purpose, the clamping ring 13 may be provided with one or more projections projecting radially outwards or with one or more recesses for attachment of a tool.

Figure 5:
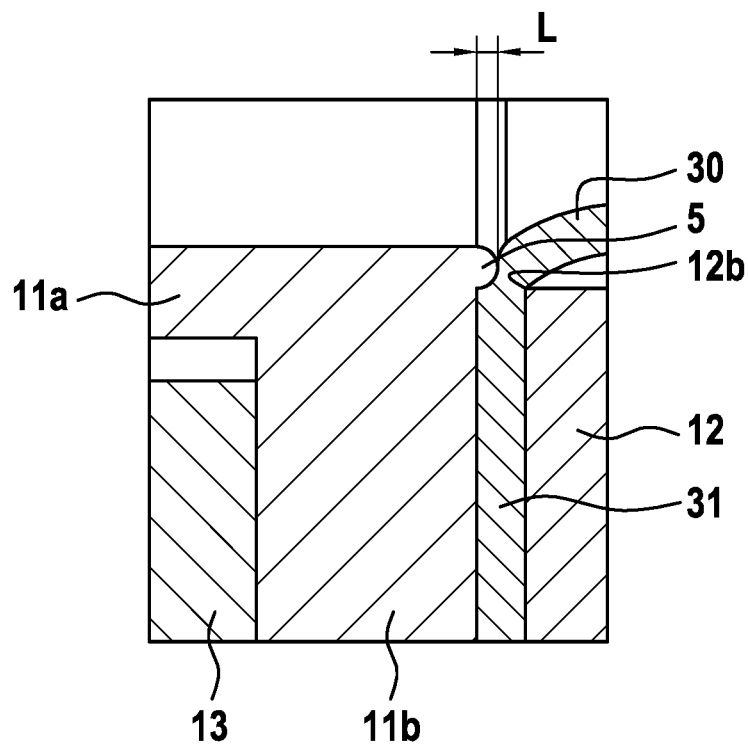
FIG. 5 is an enlarged, schematic partial sectional view of the compensator arrangement of FIG. 1.

As it is further seen from FIG. 5, the first stop member 11 comprises a circumferential axial projection 5 which protrudes in the axial direction X-X of the compensator arrangement. The axial projection 5 is formed on an inner side of the first fixing flange 11b. As can be seen in FIG. 5, which shows the assembled state of the compensator arrangement, the axial projection 5 enables increased clamping of the flexible intermediate member 30 between the axial projection 5 and an inner edge 12b of the first counter ring 12. Herein, a thickness of the flexible intermediate member 30 is reduced by the axial length L of the axial projection 5, such that stronger clamping forces act on the flexible intermediate member 30, and sealing of the compensator arrangement 1 being further improved is ensured. Such axial projection is also provided for the second fixing unit 20.

As may especially be seen from FIG. 2, the second fixing unit 20 is configured to be identical to the first fixing unit 10. The second fixing unit 20 comprises a second stop member 21, a second counter ring 22, a second clamping ring 23, and a second clamping device 24. The second connecting member 21 comprises a second connecting body 21a, a second fixing flange 21b, and through-holes 21c through which the bolts 15 of the second clamping device 24 will be passed. The bolts 15 are screwed into the second counter ring 22. The second clamping device 24 corresponds to the first clamping device, such that the second fixing flange 21b and the second end flange 32 of the flexible intermediate member 30 are clamped between the second counter ring 22 and the second clamping ring 23. As may be seen in FIG. 2, the sheet-like second end flange 32 is clamped between the second fixing flange 21b and the second counter ring 22. It should be noted that the clamping procedure for the second clamping device 24 is performed in the same way as for the first clamping device 14.

The second connecting body 21a is connected to the second pipe member 2' by a second weld joint 3'.

It should be noted that the second counter ring 22 and the second clamping ring 23 the second connecting member 21 are formed to be identical to the first connecting member 11, the first counter ring 12 and the first clamping ring 13, so that they are not shown in detail. The clamping device of the first and second fixing members 10, 20 are also identical.

Thus, according to the invention, a compensator arrangement 1 may be provided, which enables safe sealing by a clamping procedure. Herein, the bolts 15 of the clamping device are inserted through the through-holes 11c, 21c into the elongated recesses 13a, and by twisting between the counter ring and the clamping ring, the flexible intermediate member 30 is clamped at the area of the end flanges 31, 32.

Figure 6:
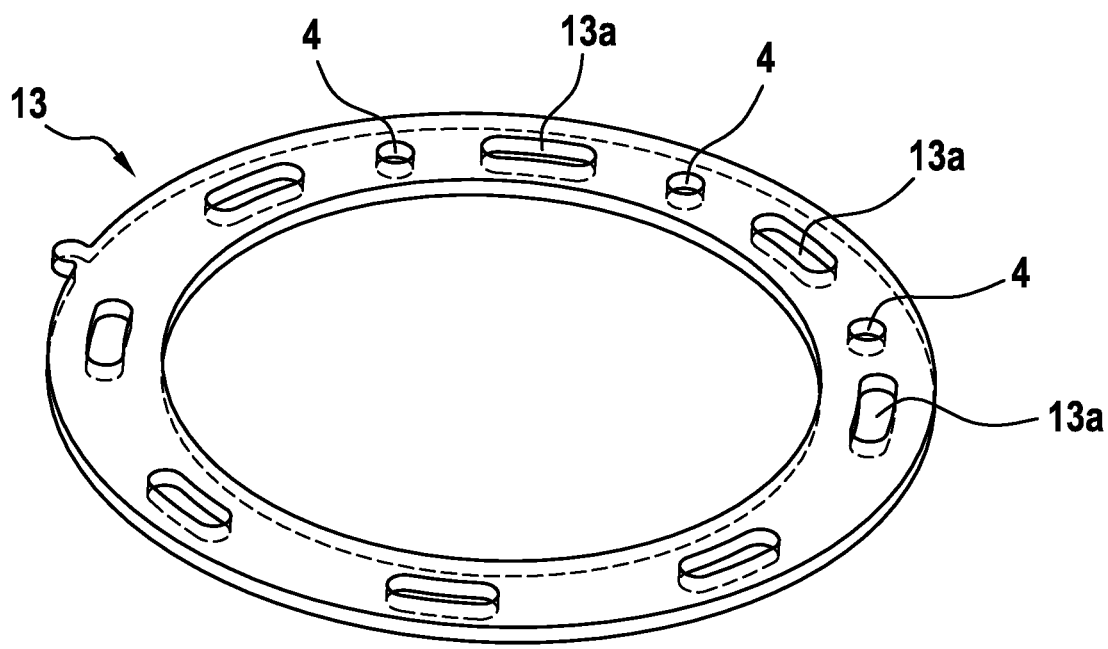
FIG. 6 is a schematic, perspective view of a clamping ring of the compensator arrangement of FIG. 1, FIGS. 7 to 9 are different views of a bolt-receiving opening of the clamping ring of FIG. 6.

To ensure that the correct clamping force is applied, the clamping rings 13 and 23 are provided with indicator means 4 in the form of through-holes, as shown in FIG. 6. As shown in FIG. 6, three positions are shown. When the clamping ring 13 and the counter ring 12 are rotated relative to each other, the indicator means 4 are also rotated such that, when predetermined markers are reached on the fixing flange 11b of the first connecting member 11, a clamping force is achieved that is predetermined as a function of the thickness of the flexible intermediate member 30. In this case, for example, colored markers may be applied to the fixing flange 11b, which then become visible through the indicator means.

Thus, according to the invention, a compensator arrangement 1 may be provided, which can be mounted in a quick and cost-effective manner. Furthermore, the compensator arrangement may also be disassembled in a quick and easy manner, if, for example, the flexible intermediate member 30 is damaged. Then, it can easily be replaced by a new flexible intermediate member 30. For this purpose, only the two fixing units 10, 20 are to be loosened and the flexible intermediate member is required to be replaced.

Figure 12:
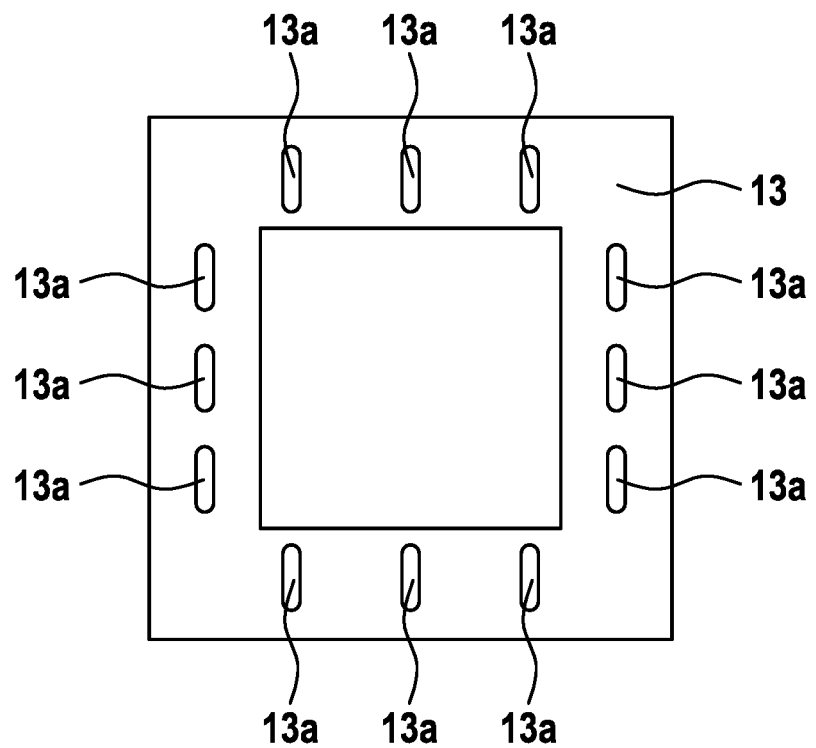
FIG. 12 is a schematic representation of a clamping ring according to a second example embodiment of the invention.

FIG. 12 shows a clamping ring 13 according to a second example embodiment of the invention. The clamping ring 13 of the second example embodiment comprises linear elongated recesses 13a instead of arcuate elongated recesses. Thus, clamping is not effected by relative rotation between the counter ring and the clamping ring as in the first example embodiment, but by linear movement between the counter ring and the clamping ring. Furthermore, the compensator arrangement of the second example embodiment comprises a square inner cross-section, as may be seen from FIG. 12.

As in the first example, the elongated recesses 13a comprise inclined ramps, which, for reasons of clarity, are not shown in FIG. 12. Otherwise, this example embodiment corresponds to the first example embodiment, so that reference may be made to the description given therein.

LIST OF REFERENCE NUMBERS 1 compensator arrangement
2 first pipe member

2' second pipe member
3 first weld joint
3' second weld joint
4 indicator means
5 axial projection
10 first fixing unit
11 first connecting member
11a first connecting body
11b first fixing flange
11c through-holes
12 first counter ring
12a threaded holes
12b inner edge of the first counter ring
13 first clamping ring
13a elongated recess
13b ramp
13c through-hole
14 first clamping device
15 bolts
15a head
15b body
15c thread
20 second fixing unit
21 second connecting member
21a second connecting body
21b second fixing flange
21c through-holes
22 second counter ring
23 second clamping ring
23a elongated recess
24 second clamping device
30 flexible intermediate member
31 first end flange
32 second end flange
33 flexible main body
A movement direction of the bolt for clamping
L length of the axial projection
R radial plane
X-X axial direction
α slope of the ramp

The invention claimed is:

1. A compensator arrangement comprising:
a first fixing unit,
a second fixing unit, and
a flexible intermediate member detachably arranged between the first fixing unit and the second fixing unit and including a main body, a first radial end flange and a second radial end flange,
wherein the first fixing unit includes a first connecting member having a first connecting body and a first fixing flange having a plurality of through-holes, a first counter ring, a first clamping ring and a first clamping device for releasably clamping the first radial end flange, the first clamping device comprising bolts and elongated recesses for receiving the bolts,
the second fixing unit includes a second connecting member comprising a connecting body and a second fixing flange having a plurality of through-holes, a second counter ring, a second clamping ring and a second clamping device for releasably clamping the second radial end flange, the second clamping device comprising bolts and elongated recesses for receiving the bolts,
wherein the first end flange of the flexible intermediate member is fluid-tightly clamped between the first fixing flange of the first connecting member and the first counter-ring,
wherein the second end flange of the flexible intermediate member is fluid-tightly clamped between the second fixing flange of the second connecting member and the second counter-ring, and
wherein the first connecting member comprises a circumferential axial projection projecting in the axial direction on an inner side of the fixing flange, wherein the flexible intermediate member is clamped between the axial projection and an inner edge of the first counter ring in the mounted state.

2. The compensator arrangement according to claim 1, wherein the bolts comprise a head.

3. The compensator arrangement according to claim 1, wherein the flexible intermediate member is made of a flexible plastic material.

4. The compensator arrangement according to claim 1, wherein the bolts are arranged on the first counter ring and on the second counter ring.

5. The compensator arrangement according to claim 1, wherein the bolts are threaded bolts.

6. The compensator arrangement according to claim 1, wherein the elongated recesses comprise ramps which are inclined towards a radial plane.

7. The compensator arrangement according to claim 6, wherein the ramps are laterally arranged on the elongated recesses.

8. The compensator arrangement according to claim 1, wherein the elongated recesses are arcuate or rectilinear.

9. The compensator arrangement according to claim 1, further comprising indicator means for determining a predetermined end position of first and second fixing units in the assembled state.

10. The compensator arrangement according to claim 1, the first and/or second connecting body comprising a cylindrical cross-section or a polygonal cross-section.

11. The compensator arrangement according to claim 1, the first and/or second connecting body comprising a square cross-section.

* * * * *